United States Patent
Lebowitz et al.

(10) Patent No.: US 7,164,759 B2
(45) Date of Patent: Jan. 16, 2007

(54) METHOD FOR CATEGORIZATION AND PRIORITIZATION OF PHONE CALLERS

(75) Inventors: David B. Lebowitz, North Richland Hills, TX (US); Mathews Thomas, Flower Mound, TX (US); Jeffery R. Washburn, Justin, TX (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 10/445,155

(22) Filed: May 23, 2003

(65) Prior Publication Data

US 2004/0234052 A1 Nov. 25, 2004

(51) Int. Cl.
- *H04M 1/56* (2006.01)
- *H04M 1/64* (2006.01)
- *H04M 3/42* (2006.01)

(52) U.S. Cl. .............. 379/142.03; 379/88.19; 379/207.03

(58) Field of Classification Search ........... 379/142.01, 379/142.07, 201.01, 201.12, 207.02, 207.12, 379/207.13, 207.15, 210.02, 211.01, 211.02, 379/212.01, 216.01, 350, 352, 355.01, 355.05, 379/355.07, 355.08
See application file for complete search history.

(56) References Cited

U.S. PATENT DOCUMENTS

| | | | | |
|---|---|---|---|---|
| 4,191,860 A | * | 3/1980 | Weber | 379/115.01 |
| 4,266,098 A | | 5/1981 | Novak | |
| 4,277,649 A | | 7/1981 | Sheinbein | |
| 4,845,743 A | * | 7/1989 | Lutz | 379/199 |
| 5,109,405 A | | 4/1992 | Morganstein | |
| 5,182,766 A | * | 1/1993 | Garland | 379/216.01 |
| 5,329,578 A | | 7/1994 | Brennan et al. | |
| 5,384,831 A | * | 1/1995 | Creswell et al. | 379/114.05 |
| 5,465,295 A | * | 11/1995 | Furman | 379/221.14 |
| 5,553,129 A | * | 9/1996 | Partridge, III | 379/221.02 |
| 5,612,993 A | * | 3/1997 | Hanaoka et al. | 379/100.03 |
| 5,625,680 A | | 4/1997 | Foladare et al. | |
| 5,745,553 A | * | 4/1998 | Mirville et al. | 379/201.05 |
| 5,781,616 A | * | 7/1998 | Youngs et al. | 379/88.01 |
| 5,835,583 A | * | 11/1998 | Hetz et al. | 379/221.02 |
| 5,864,612 A | * | 1/1999 | Strauss et al. | 379/142.03 |
| 5,867,562 A | | 2/1999 | Scherer | |
| 5,883,942 A | * | 3/1999 | Lim et al. | 379/142.01 |
| 5,956,397 A | | 9/1999 | Shaffer et al. | |
| 6,005,870 A | * | 12/1999 | Leung et al. | 370/466 |
| 6,018,572 A | | 1/2000 | Foladare et al. | |

(Continued)

OTHER PUBLICATIONS

"Method of Delivering Messages to Appropriate Devices Based On Source," IBM Tech. Disclosure Bul., vol. 37, No. 3, pp. 111-113, (Mar. 1994).

(Continued)

*Primary Examiner*—Fan Tsang
*Assistant Examiner*—Joseph T Phan
(74) *Attorney, Agent, or Firm*—Akerman Senterfitt

(57) ABSTRACT

A method (200) of categorizing and prioritizing a phone call for a recipient's phone number can include the steps of defining (205) a set of rules for a predetermined caller or a group of predetermined callers and assigning (210) a code to the set of rules. The method can further include the steps of receiving (220) a call containing the code appended by a caller to the recipient's phone number and routing (235 or 245) the call in accordance with the set of rules.

15 Claims, 1 Drawing Sheet

U.S. PATENT DOCUMENTS

| | | | |
|---|---|---|---|
| 6,072,867 A | | 6/2000 | Lieuwen |
| 6,104,799 A | | 8/2000 | Jain et al. |
| 6,160,877 A | * | 12/2000 | Tatchell et al. ............. 379/197 |
| 6,188,751 B1 | | 2/2001 | Scherer |
| 6,324,273 B1 | * | 11/2001 | Alcott ................... 379/201.03 |
| 6,363,258 B1 | | 3/2002 | Schmidt et al. |
| 6,549,619 B1 | * | 4/2003 | Bell et al. .............. 379/210.02 |
| 6,643,365 B1 | * | 11/2003 | Dunn et al. ............ 379/211.02 |
| 2001/0026609 A1 | | 10/2001 | Weinstein et al. |
| 2001/0036258 A1 | * | 11/2001 | Sugla .................... 379/211.01 |
| 2002/0013815 A1 | | 1/2002 | Obradovich et al. |
| 2005/0063526 A1 | * | 3/2005 | Smith .................... 379/207.11 |

OTHER PUBLICATIONS

"Method for Telephone Forward by Caller Constraint," IBM Tech. Disclosure Bul., vol. 37, No. 03, p. 265, (Mar. 1994).

* cited by examiner

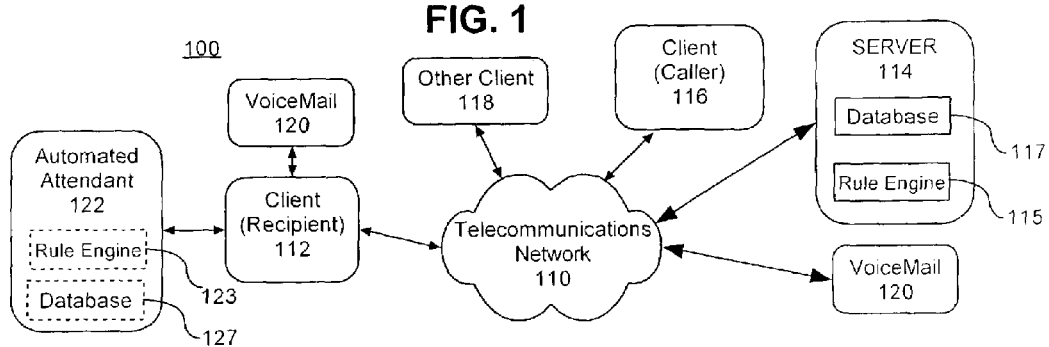
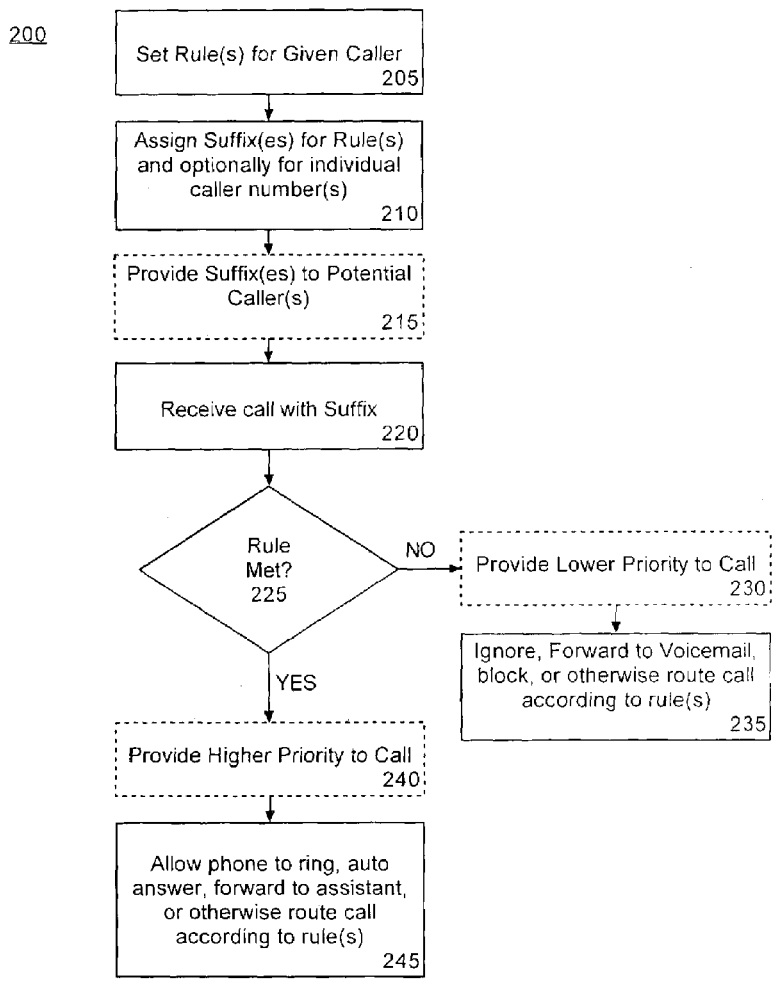

METHOD FOR CATEGORIZATION AND PRIORITIZATION OF PHONE CALLERS

BACKGROUND OF THE INVENTION

1. Technical Field

This invention relates to the field of telecommunications and, more particularly, to a call routing method.

2. Description of the Related Art

There are existing methods of rerouting telephone calls. For example, call forwarding or automated answering systems exist that allow callers to reroute their telephone calls. Often, a recipient of a call would like to immediately receive certain phone calls but allow other calls to be either ignored, sent to voice mail or other devices. Caller ID can partially assist the call recipient to determine if the call should be responded to, but Caller ID has several disadvantages. For example, Caller ID is based on the number of an incoming phone and not the identity of the person making the call. This disadvantage is particularly experienced when important phone calls come from unknown numbers which many people tend to ignore. Another problem with Caller ID occurs when the recipient is not in a position to view the caller ID and therefore ignores the call. Ignoring the call could result in a voice mail responding to the call if voice mail is set up. In certain cases it might be beneficial to ignore the call completely and not allow voicemail to be stored.

U.S. Pat. No. 6,018,572 to Foladare, et al. discusses a method for prioritizing calls in a system where a caller and a recipient are both required to subscribe to a service to allow each of the parties to prioritize calls. If the sender does not subscribe to the service, then the calls are automatically routed to the recipient's phone as normal. If both parties subscribe, then the calls are routed based on the priorities set by the caller and recipient. Such a system is dependent on the caller and recipient setting the correct priority level for the call. This system also requires that the caller and recipient have some understanding of what the appropriate level for a given call should be and further requires that both parties adhere to an agreed upon standard.

U.S. Patent Publication No. 2001/0036258A1 by Binay Sugla discusses a system for allowing a telephone subscriber to monitor and select incoming calls. The telephone subscriber is required to offer different groups of individuals several different virtual telephone numbers representing various incoming caller restrictions which are linked to a single incoming telephone line which effectively screens incoming calls without any user-intervention. This invention appears to be an inefficient use of subscriber numbers and further appears to offer a limited number of codes.

SUMMARY OF THE INVENTION

Embodiments in accordance with the present invention can enable the dynamic assignment of a suffix or a range of suffixes to different individuals for a given phone. A caller can enter a suffix after the regular number is dialed and the call will be routed to the phone, voice mail or completely ignored depending on the criteria defined by the recipient. This ensures that the recipient does not ignore calls deemed to be critical while at the same time allowing less pressing phone calls to be routed to an appropriate device (e.g. voice mail).

In a first aspect of the invention, a method of categorizing and prioritizing a phone call for a recipient's phone number can include the steps of defining a set of rules for a predetermined caller or a group of predetermined callers and assigning a code to the set of rules. The method can further include the steps of receiving a call containing the code appended by a caller to the recipient's phone number and routing the call in accordance with the set of rules.

In a second aspect of the invention, a communication server enabling a recipient to categorize and prioritize phone calls to a recipient's phone number can include a rule engine for enabling a recipient to define a set of rules for at least one among a predetermined caller and a predetermined group of callers and a processor. The processor can be programmed to assign a code to the set of rules, receive a call containing the code appended to the recipient's phone number, and route the call in accordance to the set of rules.

In a third aspect of the invention, a computer program has a plurality of code sections executable by a machine for causing the machine to perform certain steps. The steps can include defining a set of rules for at least one among a predetermined caller and a group of predetermined callers, assigning a code to the set of rules, receiving a call containing the code appended by a caller to a recipient's phone number, and routing the call in accordance with the set of rules.

BRIEF DESCRIPTION OF THE DRAWINGS

There are shown in the drawings embodiments which are presently preferred, it being understood, however, that the invention is not limited to the precise arrangements and instrumentalities shown.

FIG. 1 is a schematic diagram illustrating an exemplary telecommunications system having a server configured in accordance with the inventive arrangements disclosed herein.

FIG. 2 is a flow chart illustrating a method of categorization and prioritization of phone callers according to the present invention.

DETAILED DESCRIPTION OF THE INVENTION

Embodiments in accordance with the invention provide a solution for administering, managing, and maintaining (collectively "administering") a server for the purpose of categorizing and prioritizing phone calls by a recipient. More particularly, the server can be administered over a telecommunications network and enables a recipient to control how calls to their phone number are routed.

Other embodiments illustrate a method by which an individual can dynamically categorize and prioritize phone calls by appending a dynamic suffix or code to existing telephone numbers which would allow multiple phone numbers for a given phone. These codes or suffixes can be managed from an application which can be accessible via the internet from a browser on a computer or any pervasive device, including web enabled cell phones. Of course, other means of accessing this application are contemplated in accordance with the present invention.

Referring to FIG. 1, a schematic diagram illustrates an exemplary telecommunications system 100 having a server 114 configured in accordance with the inventive arrangements disclosed herein. The server 114 can include a database 117 and rule engine 115 that enables a recipient to define criteria and have a suffix or suffixes assigned to a particular set of criteria. As shown the telecommunications system 100 can include a telecommunications network 110, a client 112 that can optionally include a voicemail system 120 and/or an automated attendant 122 (that can also include its own rule engine 123 and database 127), the server 114 including the database 117 and rule engine 115, a voicemail system 125, a recipient client 112 or phone, a caller or originator client 116 or phone, as well as one or more other clients 118. The telecommunications network 110 can include the public-switched telephone network, wireless networks, as well as any other communications networks capable of supporting voice communications and telephony signaling data.

The server 114, as shown, can include a voice or data browser or other application (such as the rule engine 115 and database 117) that can provide access to dialog, speech recognition, text-to-speech, call control, call routing, and other interactive voice or data response functions as can be defined by a recipient. The browser can be configured to execute any of a variety of scripts or applications implemented with markup languages or other languages as suited to the aforementioned functions. In any case, the application also can include a data store which specifies associations of call control data, and particularly calling and/or called telephone numbers, with system administration applications to be described herein in greater detail.

An application such as the browser described above or the rule engine 115 can enable a user to specify certain criteria to determine which phone calls should be automatically routed to the phone and which ones should default to voice mail or other devices. There are several different criteria the user can specify.

Some of the criteria or "rules" assigned to a code or suffix can include:

1. A certain suffix that can always result in the phone ringing. This suffix can be reserved for trusted callers.
2. Certain suffixes that can result in the call being routed to the phone only at certain times of the day and routed to voice mail at other times. For example, one could choose to ignore personal calls during working hours.
3. Certain suffixes that can only result in the call being routed to the phone at certain times of the day and completely ignored at other times. This is a minor variation of the previous criteria.
4. Certain suffixes that can only result in the phone ringing if the calling plan of the user has sufficient minutes remaining in order to prioritize cell phone airtime usage.
5. Certain suffixes that can only be valid for a specified duration of time. For example, one might want to give a phone number to a car dealer for a few days to avoid long term sales pitches.
6. A dynamic suffix within a range of numbers could be provided to a caller for one time use within a very limited time period in order to prevent future callbacks. This dynamic suffix would be generated on the phone.
7. Repeat callers which have attempted to make contact without the recipient's approval could be blocked to prevent any future contact based upon the originating number. These repeat calls could be a result of someone "hacking" to identify an appropriate suffix.
8. Block granted suffixes from future use based upon the originating numbers of previous calls so that suffix is reusable in the near future.

The above is not an exhaustive set of criteria. The user may define one or more criteria above to permit a user (recipient) to define a fairly exhaustive criteria set. For example, one could define that certain suffixes will only get routed to the phone (criteria 1) in the evening (criteria 2) AND if the calling plan has sufficient minutes left (criteria 3). Other criteria or rules and many combinations and permutations of such rules can be incorporated and be contemplated in accordance with the invention.

An application such as the rule engine 115 at a phone carrier or even a rule engine 113 directly accessible at the client 112 will permit the user to define the desired criteria to create suffixes as well as manage existing suffixes. This application can be available on the web site of the phone company and the user is provided with the appropriate suffixes after the criteria is defined. The user may then inform potential callers to utilize the suffix when making calls.

An example of a list of suffixes, criteria, and it's potential uses are illustrated below:

Assigned Suffixes
0000–7000: Available for dynamic suffix usage. Current life of such suffix can be preset to thirty (30) minutes.
7777: Assigned to co-workers with rule(s) 2 and 4 below
7788: Assigned to team project members for 30 days with rules 1, 2, & 5.
8888: Assigned to spouse with rule 1.

Rules
1. Grant full access 24 hours/day, 7 days/week.
2. Limit calls to time frame and route to phonemail.
3. Limit calls to time frame, and block otherwise.
4. Allow call if calling plan has sufficient remaining time.
5. Limit use of suffix for pre-determined amount of time.
6. Limit calls to time frame, and route to recipient's phone.
7. Limit calls to time frame, and route to third party phone.

Note that the criteria or rules provide above are merely exemplary and not intended to be exhaustive by any means.

A flow chart illustrates an exemplary operational flow of the system 100 and method 200 that can begin by setting a rule or rules or criteria for a given user at step 205. The user or recipient can for example determine that they would like to limit phone calls from a particular caller such as their broker to the evening hours. The recipient therefore can go to a server such as the server 114 having a phone company's web site enabling the recipient to specify the criteria that calls for a given suffix should only be transmitted to the phone during the hours of 6 p.m. to 10 p.m. The system generates a suffix for this criteria at step 210 and can optionally display it to the user. Notice of the suffix can then be provided to a potential caller at step 215. The user can inform the broker of the phone number and suffix assigned to him. The system 100 can optionally automatically provide the caller with the suffix information via voicemail, fax or email if such information is made available to the system by the recipient or other third party directories. At step 220, the recipient can receive a phone call with an appended code or suffix that is indicative of the criteria previously set by the recipient.

The same rule engine 115 and database 117 that was used to set up the criteria can also be used to determine if such criteria or rule has been met at decision block 225. For example, when the broker (as the caller) calls the recipient and enters the appropriate suffix provided, then the rules supplied by the recipient are applied. If the criteria is met at decision block 225, the call can optionally be given a higher priority at step 240 and subsequently routed at step 245 according to the rules or criteria previously set. Thus, if the broker's call fell within an allowed time frame, the phone could be allowed to ring or auto answered or forwarded to an assistant. If the criteria is not met at decision block 225, the call can optionally be given a lower priority at step 230 and subsequently routed at step 235 according to the rules or criteria previously set. Thus, if the brokers call fell outside the allowed time frame, the phone call can be forwarded to voicemail, re-routed to a third party, ignored or blocked as otherwise defined by the rules. If desired, the recipient can also make modifications to suffixes and/or rules subsequently as their situation changes with respect to each caller.

The present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of categorizing and prioritizing a phone call to a call recipient's phone number, the method comprising the steps of:
    defining a set of rules for handling a phone call placed by an anonymous caller to the call recipient's phone, wherein the set of rules are selected among a group of rules comprising full access, time frame limited access, date limited access, route to phone mail, block call, route to third party, and route call if call recipient's calling plan has sufficient time remaining;
    assigning a plurality of codes, each code uniquely assigned to one of the set of rules;
    receiving a call containing one of the plurality of codes which is appended by the anonymous caller to the call recipient's phone number; and
    routing the call in accordance with a rule belonging to the set of rules and uniquely corresponding to the appended code, wherein the routing is based solely on the appended code independent of an identity of the anonymous caller and a calling line over which the phone call is placed;
    wherein the routing is performed using a rules engine that can be pre-programmed by the call recipient to route calls in accordance with the set of rules by at least:
        (i) recognizing a trusted-caller code and causing the call recipient's phone to ring in response to a call to which the trusted-caller code is appended,
        (ii) recognizing a time-frame code and causing a call to the recipient's phone to be blocked when the call is not received within a predetermined time-fame,
        (iii) recognizing a date-limited code and causing a call to the recipient's phone to be blocked when the call is not received within a predetermined range of dates, and
        (iv) recognizing a call-transfer code and causing a call to the recipient's phone to be routed to one of a voice-mail processor and a third-party phone number designated by the recipient.

2. The method of claim 1, wherein the method further comprises the step of notifying the anonymous caller of an assigned code.

3. The method of claim 1, wherein the method further comprises the step of tracking a caller's identification number associated with an assigned code.

4. The method of claim 3, wherein the method further comprises the step of blocking calls from a caller's phone number received a predetermined number of times having a predetermined number of different codes appended to the recipient's phone number.

5. The method of claim 1, wherein the step of assigning the code comprises assigning a plurality of suffixes to be used in conjunction with the recipient's phone number, wherein each suffix in the plurality of suffixes corresponds to a different set of rules.

6. A communication server enabling a call recipient to categorize and prioritize phone calls to the call recipient's phone number, comprising:
    a rule engine for enabling a recipient to define a set of rules for handling a phone call placed by an anonymous caller to the call recipient's phone, wherein the set of rules are selected among a group of rules comprising full access, time frame limited access, date limited access, route to phone mail, block call, route to third party, and route call if call recipient's calling plan has sufficient time remaining; and
    a processor programmed to:
        (i) assign a plurality of codes, each code uniquely assigned to one of the set of rules,
        (ii) receive a call containing one of the plurality of codes which is appended by the anonymous caller to the recipient's phone number, and
        (iii) route the call in accordance with a rule belonging to the set of rules and uniquely corresponding to the appended code, wherein the routing is based solely on the appended code independent of an identity of the anonymous caller and a calling line over which the phone call is placed;
    wherein the rules engine can be pre-programmed by the call recipient to cause the processor to route calls in accordance with the set of rules by at least:
        (i) recognizing a trusted-caller code and causing the call recipient's phone to ring in response to a call to which the trusted-caller code is appended,
        (ii) recognizing a time-frame code and causing a call to the recipient's phone to be blocked when the call is not received within a predetermined time-frame,
        (iii) recognizing a date-limited code and causing a call to the recipient's phone to be blocked when the call is not received within a predetermined range of dates, and
        (iv) recognizing a call-transfer code and causing a call to the recipient's phone to be routed to one of a voice-mail processor and a third-party phone number designated by the recipient.

7. The server of claim 6, wherein the processor can further be programmed to notify the anonymous caller of an assigned code.

8. The server of claim 6, wherein the processor can further be programmed to track a caller's identification number associated with an assigned code.

9. The server of claim 8, wherein the processor can further be programmed to block calls from a caller's phone number received a predetermined number of times having a predetermined number of different codes appended to the recipient's phone number.

10. The server of claim 6, wherein the step of assigning the code comprises assigning a plurality of suffixes to be used in conjunction with the recipient's phone number, wherein each suffix in the plurality of suffixes corresponds to a different set of rules.

11. A machine-readable storage, having stored thereon a computer program having a plurality of code sections executable by a machine for causing the machine to perform the steps of:

defining a set of rules for handling a phone call placed by an anonymous caller to a call recipient's phone, wherein the set of rules are selected among a group of rules comprising full access, time frame limited access, date limited access, route to phone mail, block call, route to third party, and route call if call recipient's calling plan has sufficient time remaining;

assigning a plurality of codes, each code uniquely assigned to one of the set of rules;

receiving a call containing one of the plurality of codes which is appended by the anonymous caller to the call recipient's phone number; and routing the call in accordance with a rule belonging to the set of rules and uniquely corresponding to the appended code, wherein the routing is based solely on the appended code independent of an identity of the anonymous caller and a calling line over which the phone call is placed;

wherein the routing is performed using a rules engine that can be pre-programmed by the call recipient to route calls in accordance with the set of rules by at least:

(i) recognizing a trusted-caller code and causing the call recipient's phone to ring in response to a call to which the trusted-caller code is appended, (ii) recognizing a time-frame code and causing a call to the recipient's phone to be blocked when the call is not received within a predetermined time-frame, (iii) recognizing a date-limited code and causing a call to the recipient's phone to be blocked when the call is not received within a predetermined range of dates, and (iv) recognizing a call-transfer code and causing a call to the recipient's phone to be routed to one of a voice-mail processor and a third-party phone number designated by the recipient.

12. The machine-readable storage of claim 11, wherein the machine-readable storage is further programmed to notify the anonymous caller of an assigned code.

13. The machine-readable storage of claim 11, wherein the machine-readable storage is further programmed to track a caller's identification number associated with an assigned code.

14. The machine-readable storage of claim 13, wherein the machine-readable storage is further programmed to block calls from a caller's phone number received a predetermined number of times having a predetermined number of different codes appended to the recipient's phone number.

15. The machine-readable storage of claim 11, wherein the machine step of assigning the code comprises assigning a plurality of suffixes to be used in conjunction with the recipient's phone number, wherein each suffix in the plurality of suffixes corresponds to a different set of rules.

* * * * *